United States Patent [19]
Turner et al.

[11] 3,753,641
[45] Aug. 21, 1973

[54] MOLD FOR ARTICLES HAVING UNDERCUT PORTIONS

[75] Inventors: Howard M. Turner, Oak Forest; Domas Adomaitis, Chicago; Elmer J. Boik, Lombard, all of Ill.

[73] Assignee: Continental Can Company, Inc., New York, N.Y.

[22] Filed: Dec. 22, 1969

[21] Appl. No.: 887,015

[52] U.S. Cl. ............. 425/450, 425/326 B, 425/342, 425/DIG. 58
[51] Int. Cl. ............................................. B29c 1/16
[58] Field of Search ......... 18/34 R, 30 WM, 30 WP, 18/42 R, 5 B, 30 LT, 5 BB, 16 T; 249/187, 161; 74/110; 425/326 B, 342, 450, 451, 441, DIG. 58

[56] References Cited
UNITED STATES PATENTS

| | | | |
|---|---|---|---|
| 2,903,740 | 9/1959 | Parfrey | 18/5 BA |
| 3,050,773 | 8/1962 | Hagen | 18/5 BZ X |
| 1,799,145 | 4/1931 | Bischoff | 74/110 |
| 2,358,857 | 9/1944 | Gits | 249/161 X |
| 2,579,399 | 12/1951 | Ruekberg | 18/5 BB UX |

FOREIGN PATENTS OR APPLICATIONS

| | | | |
|---|---|---|---|
| 1,454,915 | 5/1969 | Germany | 18/5 BZ |

Primary Examiner—H. A. Kilby, Jr.
Attorney—George E. Szekely, Joseph E. Kerwin and William A. Dittmann

[57] ABSTRACT

A partible mold has complementary body parts defining a principal portion of the mold cavity and at least one independently movable end part defining a cavity portion having undercuts relative to parting of the mold at the principal parting line. The end part is movable relative to the mold body in a direction generally parallel to the principal parting line, the parting line between the separately movable end part and the associated body part being transverse to the principal parting line. The end part is retractable from the complementary body part to clear the undercut portions of the article for parting of the body parts and ejection of the article. The end part and its actuating mechanism are carried on extension wings of the complementary body part for handling as a unit in an automatic molding machine. After ejection of the article, the end part is closed for clamping operation in association with the body of the mold.

4 Claims, 12 Drawing Figures

Patented Aug. 21, 1973

INVENTORS
HOWARD M. TURNER
DOMAS ADOMAITIS
ELMER J. BOIK
BY [signature]
ATT'Y.

Patented Aug. 21, 1973

INVENTORS
HOWARD M. TURNER
DOMAS ADOMAITIS
ELMER J. BOIK

BY George E. Szekely

ATT'Y.

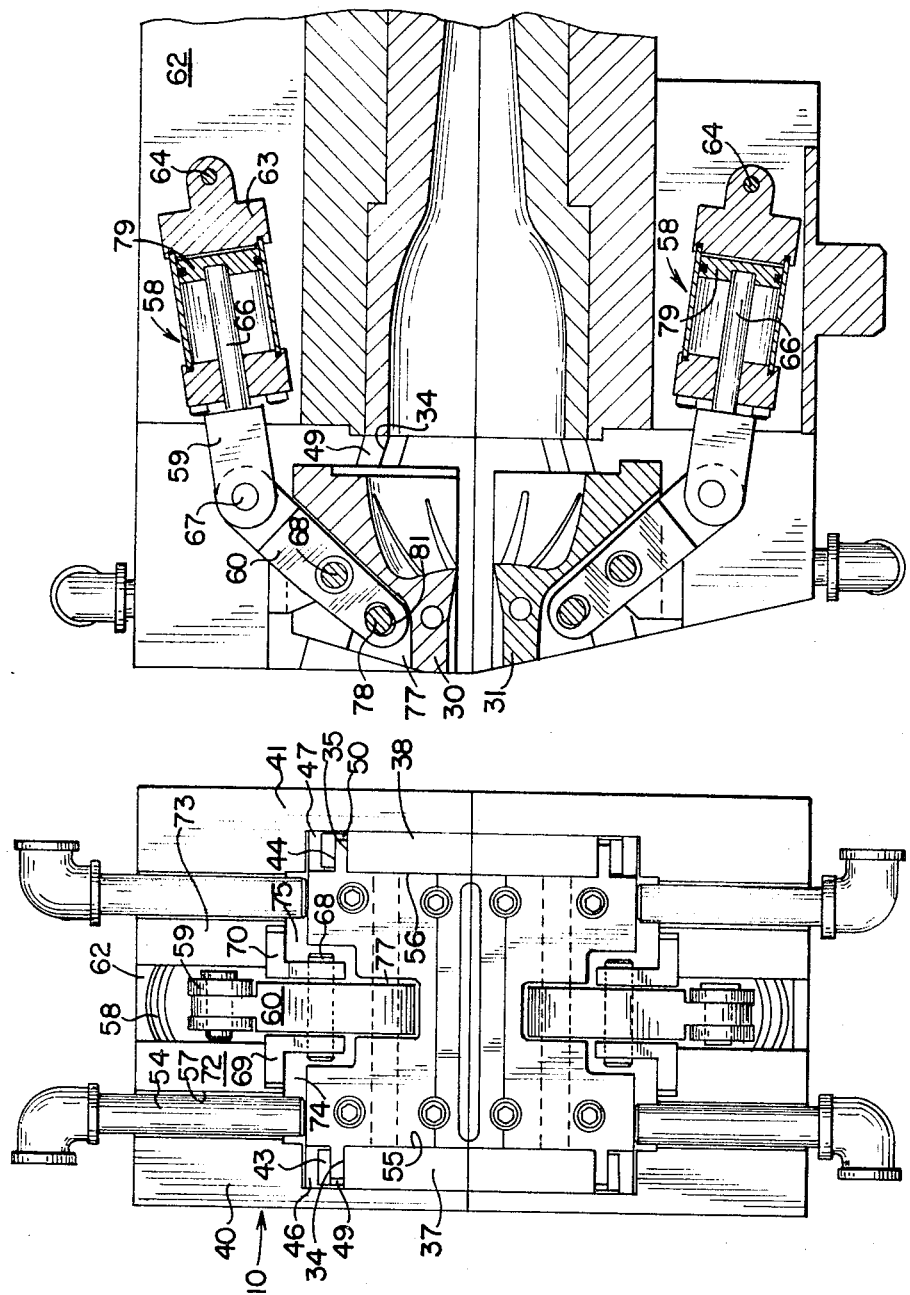

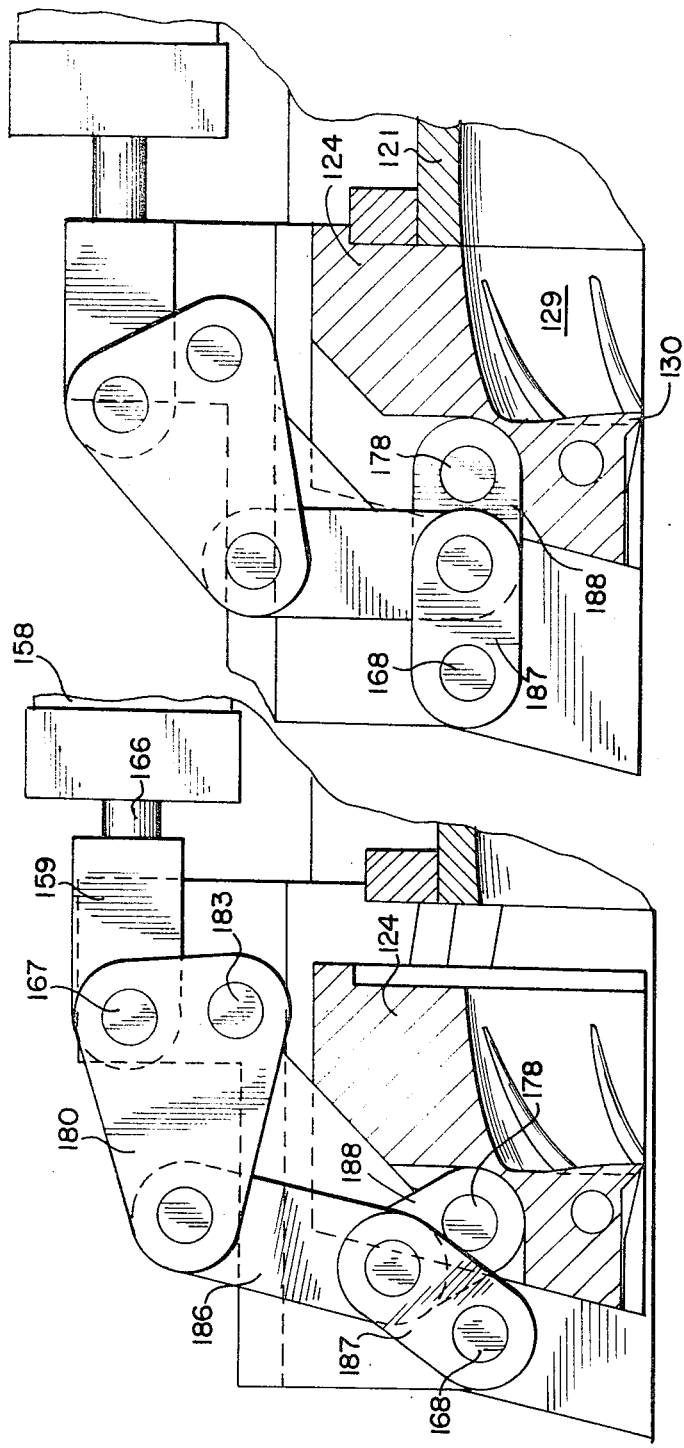

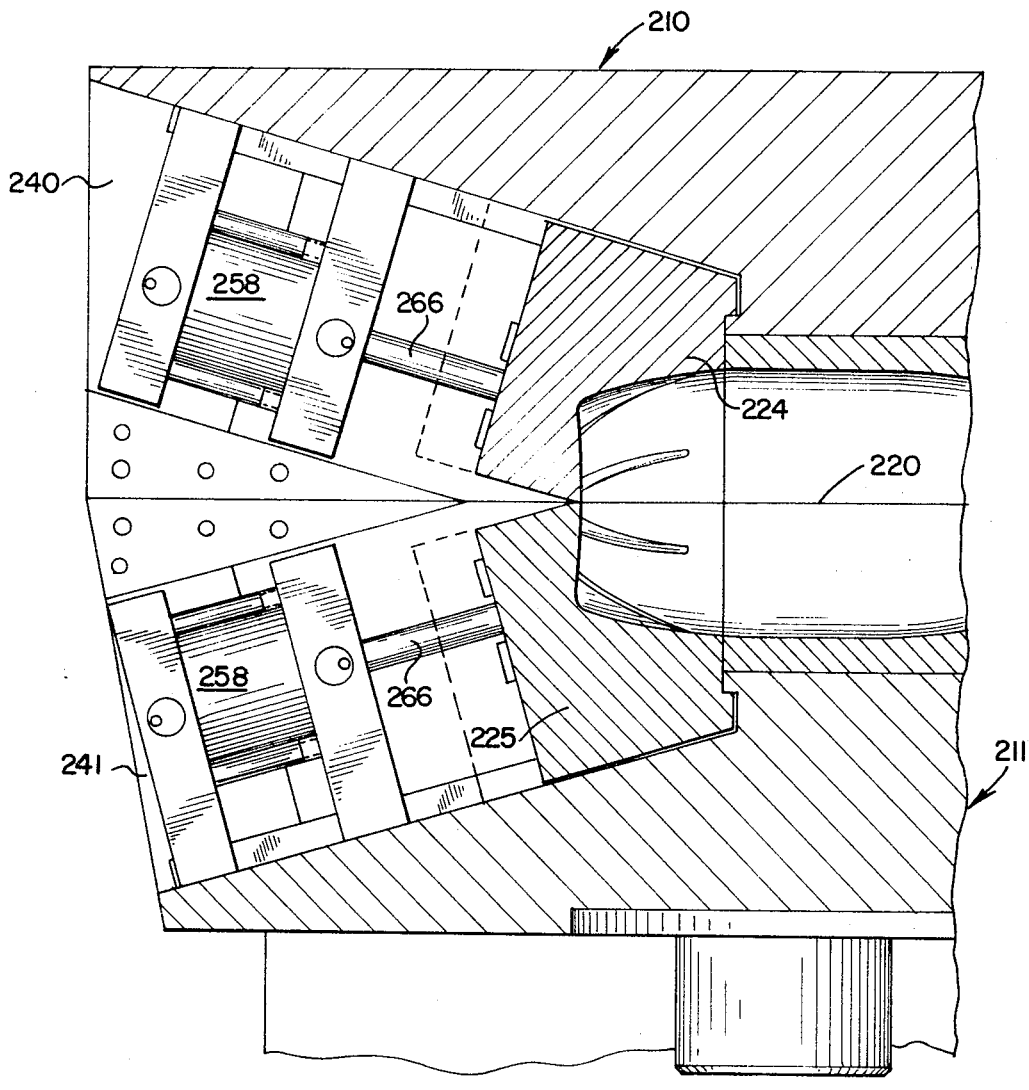

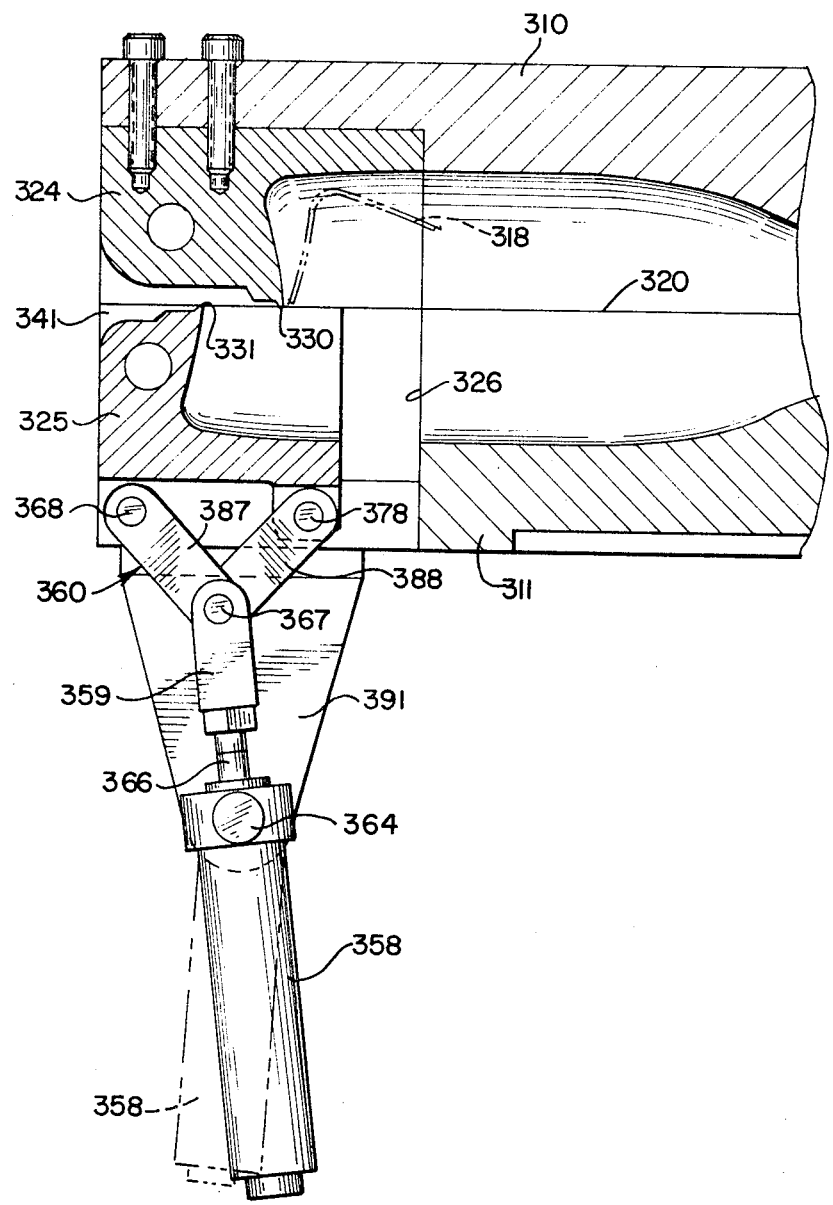

Patented Aug. 21, 1973
3,753,641
7 Sheets-Sheet 7
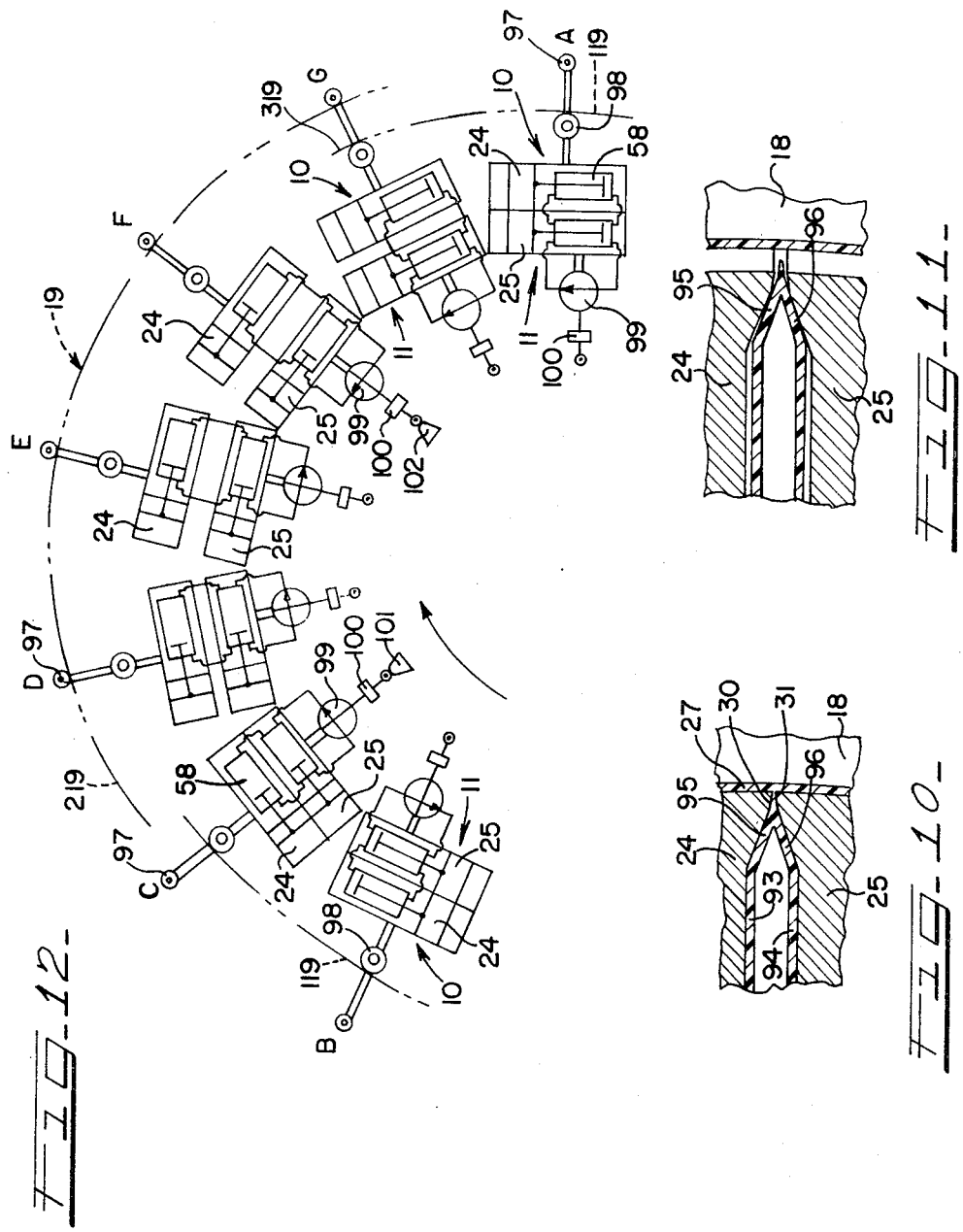
INVENTORS
HOWARD M. TURNER
DOMAS ADOMAITIS
ELMER J. BOIK
BY George E. Szekely
ATT'Y.

MOLD FOR ARTICLES HAVING UNDERCUT PORTIONS

BACKGROUND OF THE INVENTION

1. Field of the Invention

This invention relates to mold assemblies, particularly of the types used in blow-molding machines, wherein molds are carried in series on a wheel, turret, conveyor or similar carrie.

2. The Prior Art

Automatic blow molding machines are well known. In a representative machine a wheel carries a series of molds. Each mold is closed on a parison at one station, the article is blown in passage and the mold is then opened to eject the completed article at a succeeding station. The molds are usually partible on a line in a plane of a principal axis of the article, such as a bottle. The bottle is ejected from the mold in a direction transverse to the parting line. A typical bottle so made has a concave bottom, which presents an undercut relative to removal of the article from the mold.

Slight undercuts can usually be accommodated without tearing or other damage to the article in removal from a single split mold, because of the generally flexible condition of the article. However, if the bottle design involves a relatively deep bottom concavity, or sidewall undercuts, such as in a series of flutes, the bottle cannot be readily ejected from a two-part mold, without damaging the article. Therefore, some provision must be made for clearing the undercut portion of the article before the mold can be fully opened to remove or eject the article. It has been proposed to provide a plug or cap for the mold to form the undercut bottom, which cap or plug can then be withdrawn axially before opening the principal or body portion of the mold to remove the article. However, with this arrangement the plug or cap must be fully disengaged from the body parts of the mold, either or both of which must be moved transversely to complete opening of the mold. Furthermore, the provisions for end part actuation, guidance and lock-up with the plug or cap arrangement generally involves such increase in the overall length of the mold assembly as to preclude close spacing of molds in an end to end series, as found desirable in such apparatus as wheel-type molding machines. In such machines the principal mold opening and closing movement is best effected radially of the wheel, with the principal axis of the mold tangential to the wheel for reception of the parison, which is part of a continuously extruded tube. Also, no satisfactory arrangement has hitherto been devised for fully self-contained actuation mechanism carriable with the mold as a compact integral assembly and which will assure proper alignment and tight closing of the mold parts in repeated operation.

SUMMARY OF THE INVENTION

A principal object of this invention is to provide a partible mold assembly so constructed as to facilitate ejection from the mold of articles having undercut portions.

It is another object of this invention to provide a blow mold assembly particularly suitable for automatic production molding operations, wherein the mold is partible in two directions.

It is a further object of this invention to provide a blow mold structure for the production of plastic bottles or the like, wherein at least one bottom-end part of the mold is actuable for opening independently of the opening of the body parts, whereby to provide for clearing bottom-end undercuts of the article prior to opening the body of the mold for removal of the article therefrom.

It is yet another object of the invention to provide in association with a blow mold including three or more parts separable from each other along principal and transverse parting lines, actuating mechanism, including power means, compactly arranged in association with the mold parts and carried therewith in a self-contained assembly adaptable to machines of the continuously-operating type.

A still further object of this invention is to provide for parison waste separation in the course of end-part actuation, obviating a separate trim operation for such purpose.

The foregoing and other objects of this invention are achieved by means of a mold assembly including body parts, or sections, partible along a principal parting line and one or more end parts partibly associated with the body parts, each matching end part and body part constituting a mold section when matched to each other in closed condition. In one embodiment, an end part is actuable for motion relative to the associated body part along a line parallel to the principal parting line. In another form, end parts are slidable along diverging lines, separating from each other in a continuous motion simultaneously with opening relative to the body of the mold. The slide paths are established as required for clearing undercut portions of the article formed by the end parts of the mold.

In preferred forms of the invention, end part actuation is provided by fluid power cylinders and toggle mechanism, arranged to lock the mold parts in closed position. The cylinders and associated toggle mechanism are retained by the respective body mold parts, facilitating adjustment for tight closing, smooth actuation and accurate positioning of the several parts during repeated operations, with minimum attention for readjustment or other maintenance. Pivotal mounting of the power cylinder provides accommodation for linkage motion, obviating binding, and dispensing with unduly complex linkage.

It is not necessary in all cases that both end parts be movable independently of the body parts. Some articles cannot safely be pulled free of a fixed, solid section, but can be knocked out of the movable section carrying it, with a flexing or tipping action. In such case, the end part associated with the fixed section is partible and actuable as above described, but the end part associated with the movable body section may be integral therewith. Just prior to opening actuation of the movable mold section, the independently movable end part is parted from the fixed body part, thus clearing the undercut in the fixed section, permitting ready withdrawal of the article with the movable section, whereupon the bottle can be readily ejected.

Another feature of blow-mold structure according to this invention is automatic, clean cutoff of the bottom waste or parison tail. When the parison is pinched closed as the mold is closed, a thin film of waste often remains between the pinch edges of the end parts. Upon moving the end parts, or one of them, away from the body of the mold, the waste is cleanly severed by tearing or shearing adjacent the weld line, leaving a smooth weld line, with virtually no flash, so that subsequent trimming or buffing is not required.

Other features and advantages will be apparent from the following description and the drawings.

BRIEF DESCRIPTION OF THE DRAWINGS

FIG. 4 is an end view of the closed mold assembly as shown in FIG. 2;

FIG. 5 is a partial section similar to FIG. 2, but showing the end parts and actuating mechanism in the open position of the end parts;

FIG. 6 is a section similar to that of FIG. 2, showing a modified form of actuating mechanism, with the end parts retracted;

FIG. 7 is a section similar to FIG. 6, but showing the parts in closed position;

FIG. 8 is a partial section similar to FIG. 2, showing another form of the invention;

FIG. 9 is a partial section similar to FIGS. 2 and 8, showing yet another form of the invention;

FIGS. 10 and 11 are enlarged partial sections of the end parts of the assembly shown in FIG. 2, illustrating the waste severance action of the parts upon retraction; and FIG. 12 is a schematic partial view of a mold wheel as shown in FIG. 1, illustrating a molding cycle and showing the arrangement and operation of control apparatus in association with the molds according to this invention.

DESCRIPTION OF PREFERRED EMBODIMENT

For purposes of illustration, the invention will here be described in association with a production blow molding machine of the vertical rotary or wheel type, the general construction and operation of which is shown and described in commonly assigned U.S. Pat. No. 2,784,452 issued Mar. 12, 1957 to Herbert S. Ruekberg and John L. Szajna.

Figure 1:
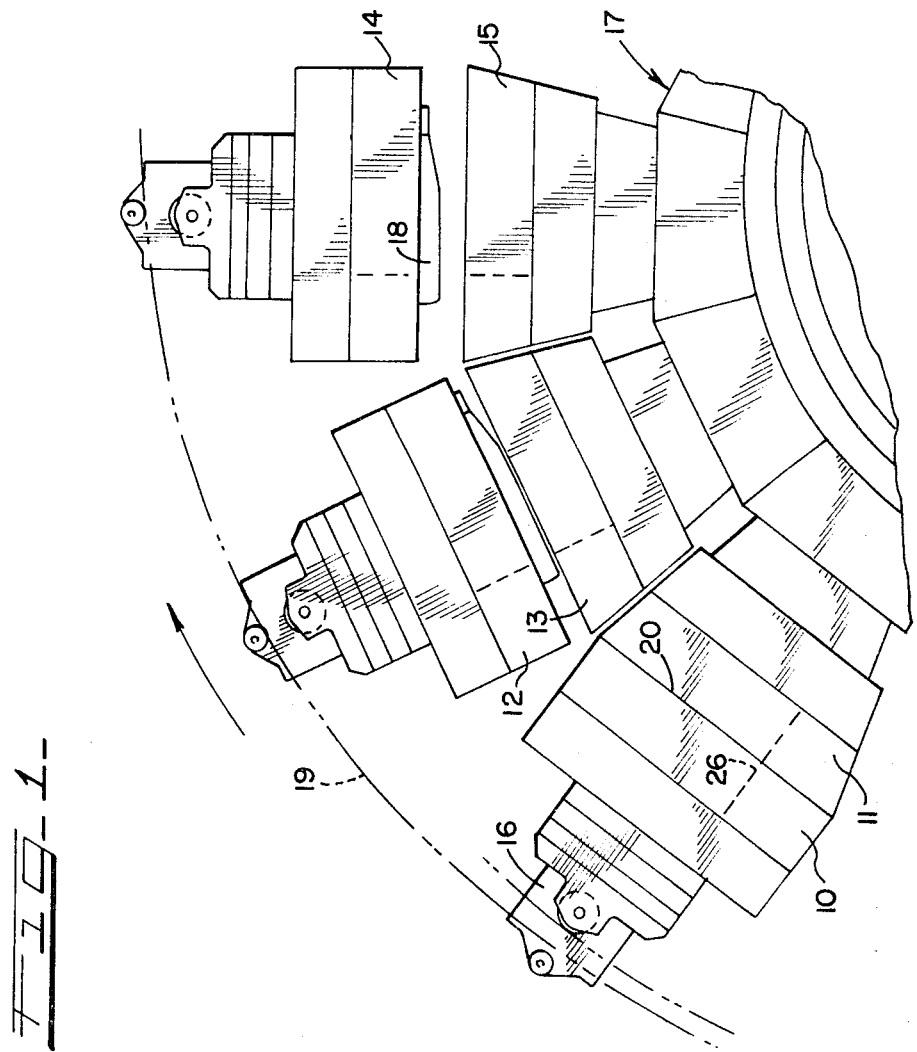
FIG. 1 is a partial elevation of a blow mold wheel in outline, showing some of a series of molds or mold assemblies according to this invention at their opening stages.

FIG. 1 shows a portion of a mold wheel such as that shown in the aforesaid Ruekberg and Szajna patent, including three molds or mold assemblies 10–11 12–13 and 14–15, constituting part of a series of molds carried on a plurality of arms 16 attached to hub 17 for continuous rotation in the clockwise direction as here shown and as indicated by the direction arrow. The various molding operations are performed during rotation of the hub or wheel 17, a complete cycle for one mold taking place during each revolution.

The successive arms 16 shown in FIG. 1 are in passage through the mold-opening stages of the cycle, mold 10–11 being closed and carrying the blown article, here shown as a bottle 18. Mold 12–13 is partially open and mold 14–15 is fully open, preparatory to knockout of the completed bottle 18 arried in outer mold half 14, the outer half of the mold being in this arrangement radially movable under control of the cam track 19. The molds are successively closed to the condition of mold 10–11 in another stage during the revolution of the mold wheel, under control of a closing cam track segment, not here shown.

In the foregoing general description of the machine the terms "opening" and "closing" have been employed in reference to a principal parting line indicated at 20 between mold halves 10–11 such being the opening and closing action required for production of articles of types heretofore considered suitable for molding in the type of machine described.

According to this invention, mold structure and associated actuation mechanism are provided in forms particularly adaptable to machines of the type above generally described, with the same general operation, to facilitate production of articles in types or shapes not heretofore considered practicable for production in such machines, notably articles involving undercuts precluding satisfactory ejection of the article from molds heretofore known. Representative of such articles are bottles having deep bottom concavities, a series of axial bottom-end flutes, or the like.

Figure 2:
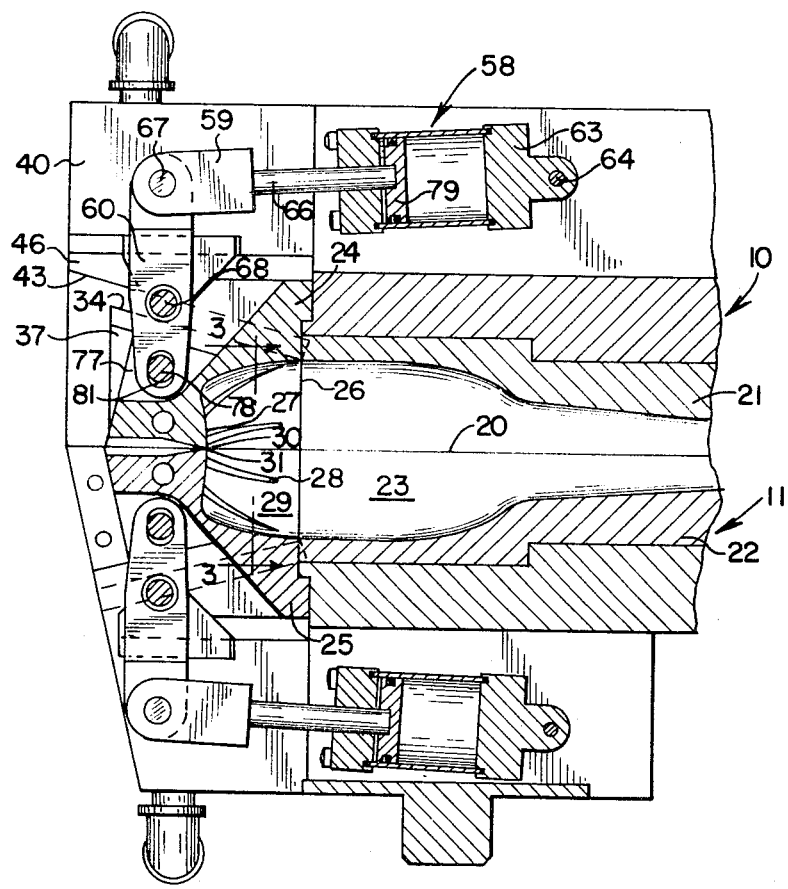
FIG. 2 is a partial longitudinal section through one of the mold assemblies of FIG. 1, the section being taken at right angles to the principal parting line of the mold when closed, showing details of the mold assembly.

FIG. 2 illustrates the construction of a mold assembly according to this invention, as adapted for use in the machine of FIG. 1. Mold sections 10 and 11 include respective mold body parts 21 and 22, defining the principal or body-forming cavity 23. Body parts 21 and 22 are partible with sections 10 and 11 along parting line 20 which general or principal parting line is in a plane including the axis of the cavity 23.

The bottom-end forming portion of the mold 10–11 consists of complementary mold end parts 24, 25, mating with each other along the principal parting line 20 and with respectively associated body parts 21 and 22 along the transverse parting line 26.

The cavity walls of end parts 24 and 25 are contoured to form a concave bottom end and generally lengthwise flutes on the bottle to be molded, as provided for by the corresponding bottom wall 27 and the several ribs 28 around the end cavity 29. The wall 27 and certain ones of ribs 28 constitute undercuts relative to parting along the principal parting line 20, the condition as to the rib portions 28 nearest line 20 being best seen in FIG. 3, wherein the bottle 18 is indicated in broken lines.

Referring again to FIG. 2, the end parts 24 and 25 are provided with opposed lands or edges 30, 31, which serve to pinch and weld the parison and so to hold the parison sealed during blowing, with the mold fully closed, its condition in FIG. 2.

Figure 3:
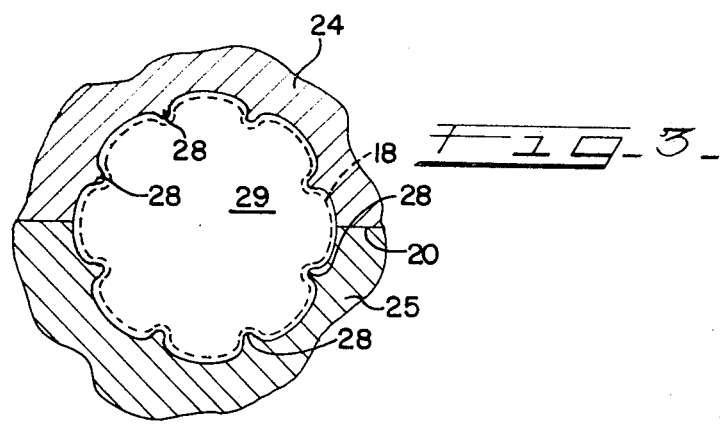
FIG. 3 is a partial transverse section on line 3—3 of FIG. 2, showing the undercut condition relative to the principal mold parting line.

In order to assure accurate alignment in closing the mold upon repeated actuations of the end parts 24 and 25, the same are carried and guided upon portions of the respective mold halves or sections 10 and 11, carrying body parts 21 and 22. Compactness and simplicity are provided by encasing the end part actuation means, assembly or, mechanism, comprising linkage and motive power means or units, in the mold halves 10 and 11, as seen in FIG. 2. The construction and operation of the end part actuation mechanism and arrangement for support and guidance are best understood by reference to FIGS. 2 to 5 inclusive, FIGS. 2 to 4 showing the position of the parts with the mold fully closed, and FIG. 5 showing the position of the parts with the end parts 24 and 25 fully retracted, but the body parts 21 and 22 in their closed positions. Inasmuch as the construction and arrangement for both end parts are identical, the description hereafter will refer in detail only to end part 24, carried by the outer mold half 10.

The direction of end-part opening motion is established according to the particular end configuration of the article. In the case here illustrated, linear motion of the end part 24 away from the body part 21 at a small angle to the principal parting line 20 provides draw suitable for freeing the end part 24 from the article or bottle 18. Therefore, the end part 24 is guided on opposite sides by paralle, angularly extending rails 34 and 35 formed respectively on the retaining plates or retainers 37 and 38 affixed to wings 40 and 41, which extend endwise from mold half 10.

Edges 43 and 44 of respective inserts 46 and 47 and correspondingly opposed rail edges 34 and 35 define guideways 49 and 50 to receive the guide flanges 52 and 53, which extend laterally from end part 24 and fit closely in the guideways. The body of end part 24 is a close sliding fit between guide faces 55 and 56 of retainers 37 and 38, maintaining lateral alignment of end part 24, while guideways 49 and 50 maintain the vertical alignment. Thus, end part 24 is precisely held to a prescribed path of movement to and from its closed position in true alignment with its associated body part 21. Coolant circulation pipes 54, connected to end parts 24 and 25, glide back and forth in slots 57 as the end parts 24, 25 are actuated in retracting and closing movements.

The actuation apparatus or mechanism associated with end part 24 comprises the double acting cylinder 58, clevis 59 and link 60. This power toggle mechanism serves to drive end part 24 on its prescribed path between its closed and retracted positions and to clamp part 24 in its closed position. Cylinder 58 is housed in chamber 62 of mold half 10 with head end 63 pivotally supported on shaft 64, which is trunnioned in mold half 10. Piston rod 66 is affixed to clevis 59 which is pivotally connected to link 60 by means of pin 67. Link 60 pivots about pin 68 which is trunnioned in opposed angle clips 69 and 70. Clips 69 and 70 are clamped between blocks 72 and 73 and pads 74 and 75 respectively. Link 60 extends into the pocket 77, the end of the link being trunnioned on pin 78.

Referring now particularly to FIG. 2, the admission of pressure fluid into cylinder 58 on the head side of piston 79 clamps end part 24 against body part 21, the corresponding actuation of the duplicate mechanism associated with end part 25 effecting and maintaining tight closure between end part 25 and body part 22.

In its application to blow molding, the end part actuating mechanisms above described are actuated while the mold halves 10 and 11 are separated preparatory to parison capture. Thus, the mold assembly formed of the four parts 21, 22, 24 and 25 operates to capture the parison as though the mold were a two-part mold consisting of halves 10 and 11. The reaction to parison clamping pressure and component of blow pressure on the end parts, transverse to the parting line 20, are taken on the links 60 substantially as pure columnar load, the links being held in such columnar position by pressure in the cylinders 58, which pressure is maintained at a value sufficient to overcome the blow pressure load component parallel to line 20 tending to move parts 24 and 25 in the direction away from corresponding body parts 21 and 22. This endwise load is taken substantially axially of the rods 66. That is, link 60 and rod 66 constitute a substantially rectilinear toggle, minimizing bending stresses in the parts, rods and links, distortion of the links being substantially obviated by virtue of alignment of the respective end parts axially of the links. The pivots are spaced to effect mechanical advantage in favor of the closing pressure exerted by the cylinders 58, so that the necessary holding force can be developed with relatively small cylinder diameter and moderate fluid pressure, the mold assembly thus being quite compact.

When the bottle has been fully blown and suitably cooled, pressure is admitted to cylinders 58 on the rod side of the piston 79, while the head sides are exhausted, effecting retraction of the end parts 24 and 25, along the lines determined by the guideways above described, to the position of FIG. 5, freeing the end of the bottle for separation of the mold halves 10 and 11. A self-alignment characteristic is provided by slots 81 at the engagement of links 60 with the driven pins 78 and by supporting the cylinders 58 on trunnions 64. These provisions permit the use of a simple crank action in lieu of more complex, bulkier and costlier mechanism. Also, by positioning of pin 78 to effect reaction force, near the center of gravity of the end part 24, warpage of the end part 24 is substantially obviated.

Suitable actuation control is described subsequently.

MODIFICATIONS

The form of the invention above described is particularly suitable for mass production blow molding of bottles or similar articles of various sizes on a machine such as that shown in FIG. 1. However, it will be understood that the invention is not limited to the particular form or adaptation, or to blow molding, but can be adapted to other applications, other machines, or for semi-automatic or manually controlled operation. Variations and modifications can be readily made, to suit various conditions or requirements.

Pneumatic actuation and clamping by means of the cylinders 58, above described, provides desirably fast action. However, hydraulic rams, motors, solenoids or the like can be readily substituted, if preferred.

Where particularly high clamping and holding pressures are involved, a self-locking toggle is preferred, for maximum assurance against rock or creep and consequent loss or inequality of clamping pressure. Such toggle mechanism is shown in FIGS. 6 and 7, wherein parts corresponding to those previously described are given like reference numberals with the addition of 100. FIG. 6 shows the condition of the linkage in the retracted position of end part 124, while FIG. 7 shows the linkage condition corresponding to closed position of the end part.

Rod 166 of cylinder 158 carries block 159, with pivot pin 167 driving the double-crank links 180 around the anchored pivot pin 183. Links 180 are pinned to drive link 186, which actuates the toggle link 187 about anchored pin 168. The other toggle link 188 carries part 124 by means of pivot pin 178. Head-side actuation of the cylinder 158 throws the linkage to the position of FIG. 7, clamping and locking part 124 to body part 121, part 124 being configured and guided substantially as described in association with the form of FIGS. 2 to 5. By virtue of clamping edge 130 being inward of pivot pin 178, clamping pressure and resultant torque are effective in a direction to maintain toggle links 187 and 188 in locked position shown. Lateral component of blow pressure in cavity 129 acts similarly, while end thrust is borne by the column formed by links 187 and 188, hinging on pin 168. Also, the geometry of the linkage is such as to require only a very short stroke of rod 166, whereby cylinder 158 may be comparably short, thus conserving in length of the mold assembly required for housing the actuating mechanism. This space conservation is particularly desirable for molds carried on a wheel, providing maximum production for given wheel size and speed.

In cases where space permits, direct actuation of the end parts can be provided as shown in FIG. 8, wherein parts corresponding to those of FIGS. 2 to 5 are correspondingly numbered with the addition of 200. In this form the actuation cylinders 258 are anchored in chambers 240 and 241 of mold halves 210 and 211 respectively, the cylinders being aligned with the respective end parts 224 and 225, which are configured and guided substantially as shown for the corresponding end parts in FIGS. 2 to 5. Piston rods 266 are connected directly to the respective end parts 224,225. As observed previously, the angle of inclination for the paths of the end parts relative to the principal parting line 220 is dictated by the cavity configuration, with respect to clearing the article upon retraction of the end parts. The conditions in this respect are shown the same in FIG. 8 as in FIGS. 2 to 5.

In some cases it is not necessary that both end parts be retractable. Such a case is illustrated in FIG. 9, wherein parts corresponding to those shown in FIGS. 2 and 5 are given like reference numerals with the addition of 300. In the modification here shown the end parts 324 and 325 are configured for forming a concave bottom on a bottle, but there are no other details presenting problems of withdrawal or ejection of the article from the mold.

The arrangement shown in FIG. 9 is one designed for use in the machine shown in FIG. 1, wherefor upper or outer mold half 310 is laterally movable to open the mold, while lower or inner half 311 is fixed relative to its support. Accordingly, end part 325 is retractable relative to the associated inner mold half 311, while end part 324 is fixed to mold half 310. End part 324 may be formed as part of mold half 310, if desired, but is preferably a separate piece machinable with end part 325, for economical manufacture with precision finishing. End part 325 is arranged for sliding in wing extension 341 of mold half 311, substantially in the manner shown for the corresponding parts in forms previously described. However, in this case the article can be cleared for withdrawal from mold half 311 by retracting end part 325 on a line parallel to principal parting line 320, the drawing showing part 325 in retracted position. Retraction and closure are effected by means of the cylinder 358, which is provided with a trunnion 364 for pivotal support on a pair of brackets 391, of which one is here shown, the brackets being affixed to wing 341. Clevis 359 on piston rod 366 is pivotally connected to toggle linkage 360 by means of pivot pin 367. Link 387 is pivotally supported on wing 341 by pin 368, while link 388 is pivotally connected to end part 325 at pin 378. Links 387 and 388 form a locking toggle, similar to that of FIGS. 6 and 7, effective to clamp end part 325 to body part 311 when rod 366 is actuated in its outward stroke, cylinder 358 assuming the position shown in broken lines when end part 325 is in its closed position.

After an article is molded, and end part 325 is retracted to the open position shown, the article 318, captive in movable half 310, is drawn therewith from mold half 311, whereafter the article can be ejected from mold half 310 by rapping the article at its end remote from end part 324, causing the article to tip clear and fall out of the half-mold cavity, as shown in the broken lines.

WASTE SEVERANCE

The several forms of the invention above described are adapted for blow molding apparatus, wherein the tubular parison is pinched closed adjacent the mold cavity. The pinched condition as it prevails in use of the mold assembly of FIG. 2 is illustrated in FIG. 10. The drawing shows the position of the parts and the condition of the parison with the mold closed and the parison fully blown to form the article 18, of which the bottom end is shown adjacent the pinch-off. The construction and operation of the mold parts is such that the waste portion of the parison is automatically and cleanly severed from the article upon retraction of the end parts 24 and 25, as seen in FIG. 11, even should the pinch-off lands fail to effect full severance upon pinch-off.

In FIG. 10, the parison is shown pinched and welded under clamping pressure with a film of parison material between the pinch-off edges 30 and 31, which taper to effect minimum clearance therebetween at cavity bottom wall 27. The waste portion of the parison is captured between the opposed end part surfaces 93 and 94, forming shoulders 95 and 96 on the parison waste. Upon retraction of the end parts 24 and 25, these parts move toward the position of FIG. 5, the position of FIG. 11 being intermediate. Parts 24 and 25 bear on the shoulders 95 and 96, tensioning the thin web of the waste from the article 18, the material being thinnest at the line of attachment by virtue of the tapered edge lands above noted. It has been found in practice that this severance is sufficiently clean and flush as generally to obviate residual flash on the article 18, thus dispensing with a separate flash trimming or buffing operation along the weld line.

Similar waste cutoff occurs upon retraction of the end parts in the form of FIG. 6 and of the lower end part 325 in the form of FIG. 9. In the latter case, in addition to the tensile force on the waste film there is a shearing action between the pinch-off lands 330 and 331 consequent upon the endwise movement of part 325 relative to end part 324.

AUTOMATIC CONTROL

The mold assembly of this invention is readily adaptable to automatic control. In the rotary molding machine shown in FIG. 1, each mold passes through several stages, comprising clamping, blowing, cooling, opening, article ejection and closing. At clamping, blowing and cooling stages, the mold is fully closed. After the article is sufficiently cooled to be self-sustaining, the mold is opened, and the article ejected, whereafter the molding cycle is repeated.

Control of mold actuation in the machine of FIG. 1, with the mold assembly of FIG. 2, is shown schematically in FIG. 12. In the latter view the mold assembly rotates clockwise, as in FIG. 1. Radial movement of outer mold half 10, for opening and closing with respect to half 11, is controlled by followers 97 and 98 riding corresponding segments of track 19. Closing and retraction motions of end parts 24 and 25, relative to corresponding halves 10 and 11 respectively, are controlled by the condition of two-position valve 99 serving cylinders 58, in response to actuation of limit switch 100.

At station A the mold is fully closed, with parts 10, 11, 24 and 25 clamped together and on the parison. This mold condition obtains as the mold proceeds around the track to stage B, parts 24 and 25 being clamped to parts 10 and 11 by virtue of pressure on the rod side of cylinders 58, admitted through valve 99, while the cylinder head ends are connected to exhaust. Parts 10 and 11 are held closed by cam segment 119 acting on follower 98. At station C a cam 101 actuates limit switch 100 to reverse the position of valve 99, admitting air into the head ends of cylinders 58 and exhausting the rod ends, thus effecting retraction of end parts 24 and 25. Thereafter, the opening control follower 97 enters the opening track segment 219, drawing mold half 10 open, as shown in station D, reaching full open position prevailing at station E, end halves 24 and 25 remaining in the retracted position. The article is ejected while the mold is fully open. At station F cam 102 trips limit switch 100, repositioning valve 99 to restore end parts 24 and 25 to their closed positions, preparatory to closing and clamping of halves 10 and 11, as follower 98 travels cam segment 319 in progress at station G and completed at station A, from which the cycle repeats.

Thus, the closing and opening action of end parts 24 and 25 independently of closing and opening of halves 10 and 11 facilitates correspondingly independent timing, whereby to assure that undercut interference is fully cleared before final parting of the mold and that the end parts are repositioned for clamping action before the clamping stage. With limit switch control and air cylinder actuation of the end part motions, actuation is virtually instantaneous, so that there is no sacrifice of cycle time from the other operations, which proceed as in the production of similar articles not involving the undercut problem. Accordingly, the mold apparatus and control according to this invention can be incorporated in a standard machine interchangeably with other molds, without basic cycle modification or major structural changes in the machine and its auxiliaries. In the case of the blow molding machine described, pressure air for the cylinders can be tapped from the lines providing blow air to each mold, as regularly provided in such apparatus, so that no special air manifold or other special supply is involved.

We claim:

1. A mold section for a partible mold including first and second relatively movable mold portions defining respective undercut bottom wall portion forming and body wall portion forming cavities, said cavities defining coincident cavity surfaces in the closed position of said mold portions, means for applying relative motion to said first and second relatively movable mold portions to move the cavity defining surfaces thereof away from each other to an open position, said applying means includes pivot means and toggle linkage means, said toggle linkage means being disposed between said pivot means and said bottom wall portion forming cavity, said pivot means includes a first stationary pivot pin, a link mounted upon said first stationary pivot pin, means for imparting motion to said link, said toggle linkage means includes at least two links, one of said two links being pivotally secured to said bottom wall portion forming cavity by a first pivot pin movable therewith, and the other of said two links being pivotally secured to a second stationary pivot pin.

2. The mold section as defined in claim 1 including another link pivotally mounted between said first mentioned link and said two links by respective movable pivot pins.

3. The mold section as defined in claim 2 wherein said first-mentioned link is a bellcrank lever joined by a fourth movable pivot pin to said relative motion applying means.

4. The mold section as defined in claim 3 wherein said relative motion applying means is a piston-cylinder fluid motor.

* * * * *